JOHN B. WICKERSHAM.

Improvement in Lubricators.

No. 4,602. Reissued Oct. 17, 1871.

John B. Wickersham

Witnesses,

Chas H. Smith

Geo. D. Walker

L. W. Serrell atty

UNITED STATES PATENT OFFICE.

JOHN B. WICKERSHAM, OF PHILADELPHIA, PENNSYLVANIA.

IMPROVEMENT IN LUBRICATORS.

Specification forming part of Letters Patent No. 82,667, dated September 29, 1868; reissue No. 4,602, dated October 17, 1871.

*To all whom it may concern:*

Be it known that I, JOHN B. WICKERSHAM, of Philadelphia, in the State of Pennsylvania, have invented and made an Improvement in Lubricators; and I do hereby declare the following to be a correct description thereof.

In Letters Patent granted to me for an improvement in lubricators dated October 22, 1867, a metal tube and socket are employed with a glass oil-receptacle. In almost all of the lubricators heretofore made the metallic portions are of brass or copper. I have discovered practically that with almost all kinds of oil the brass or copper renders the same of a greenish color and frequently of a gummy consistence that does not properly lubricate, and is liable to interfere with the capillary action of the feeding-wire and fibrous covering. To obviate these difficulties I make use in the lubricator of a glass reservoir and a metallic tube and cap of white metal or pewter that is not affected by the oil; hence said oil is not discolored or rendered gummy, but retains its purity and limpid condition, and the capillary-feeder and openings are not obstructed by the impurities and coloring matter of the oil resulting from the action thereof upon brass or copper tubes or mountings for the glass receptacle.

Figure 1:
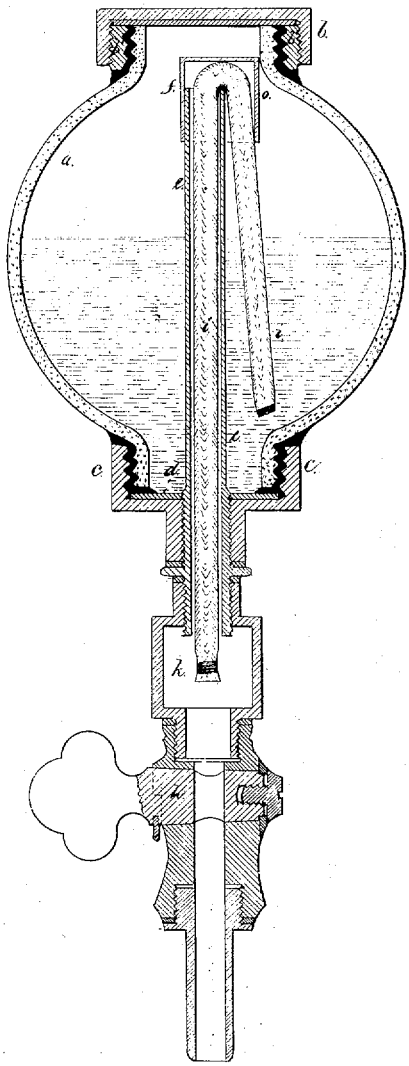
Figure 2:
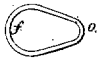

In the drawing, Figure 1 is a vertical section of my improved oil-cup, and Fig. 2 is an inverted plan of the cap for the tube of the oiler.

Figure 3:
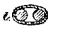
Figure 4:
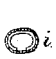

*a* is the glass receptacle or reservoir, formed with necks and openings at its upper and lower portions, on the outsides of which are screw-threads. *b* is the metal cap for the upper part of the reservoir, by the removal of which the reservoir may be filled. This metal cap *b* screws upon the outside of a collar, *b'*, that is screwed upon the glass neck and rendered tight by suitable cement, and a washer introduced between the cap *b* and collar *b'* renders the parts tight for an object hereafter mentioned. *c* is a socket of metal, into which the lower neck of the glass reservoir *a* screws, and the parts are rendered perfectly tight by a washer, *d*, and by packing cement between the metal of the socket *c* and the glass *a*. The tube *e* is screwed into the lower part of the cap *c* and extends up into the oil-space in the reservoir *a* to near the cap *b*, and into this the capillary-wire or feeder *i* is introduced to draw over the oil and lubricate the mechanism to which it is applied. I make use of a removable sleeve, *f*, set over the upper end of the tube *e* and feeder *i*, a swell, *o*, being provided upon one side that allows the capillary-wire or feeder to pass freely, but prevents the oil flowing over into said tube *e*, in consequence of any agitation of the lubricator, as in cranks and connecting-rods of engines and loose pulleys. The metallic parts in contact with the oil are made of white metal or alloy resembling pewter, in order that the oil may not be injured or discolored, as in lubricators of brass or copper. The capillary-feeder *i* is made of two or more wires within a fibrous tube formed by braiding cotton or other fiber around them, and there is a space left between such wires to form a tube that acts as a siphon, (see Fig. 3,) or said tube may be a strip of metal bent up into a tubular form, but with the seam open, so as not to make a tight pipe, as shown in Fig. 4. In order to set this capillary-feeder in efficient operation it is important that it be immersed in the oil so as to drive out any air. To effect this the oil-cup should be filled up as high as the top of the said capillary-feeder, and to prevent oil flowing rapidly down the tube *e* I apply a cock at *h*. When this cock is closed the oil will be shut off, and thus prevent waste when not in use, and the siphon action continuing, the chamber *k* and the tube *e* will be filled almost to the level of the oil in the receptacle *a*. When the cock *h* is opened the body of oil, as it descends in the tube *e* and chamber *k*, will cause the aforesaid capillary-feeder to commence its regular supply, unless the oil is so nearly exhausted as to require replenishing. When the oil is run out of the chamber *k* the supply will be drop by drop from the capillary-feeder. In cases where my said feeder is applied to a revolving pulley or wheel the screw-cap *b* prevents the oil wasting out either by inversion of the cup or by centrifugal force, and the cap or sleeve *f* and capillary-feeder insure a regular supply to the axle or journal.

I claim as my invention—

1. The sleeve *f*, formed with a swell upon one side, in combination with the tube *e* and reservoir *a*, substantially as specified.

2. A lubricator formed with the tube *e* of white metal, for the purposes and as specified.

3. The combination of the glass reservoir *a* and screw-neck at its lower end with the socket *c* and washer *d*, rendered permanently tight by cement, as set forth.

4. A capillary-feeder formed by metal wires or rods, or a tubular strip of metal inclosed in a fibrous covering, so as to form a siphon, as and for the purposes set forth.

5. The cock *h* and chamber *k*, in combination with a capillary-feeder and oil-cup, substantially as set forth.

6. A lubricator with a glass reservoir and two necks, having pewter or white-metal connections wherever the oil comes in contact with the metal, to prevent discoloration, as set forth.

7. A lubricator having a glass reservoir and contracted neck at the upper end, in combination with a cap or cover surrounding and covering the said neck, substantially as set forth.

8. A glass oil-holder for a lubricator made with contracted necks at both ends, with screws upon their outer surfaces for the caps or sockets, as set forth.

9. A removable sleeve, *f*, upon the feeding tube *e*, in combination with the capillary-feeder *i*, substantially as set forth.

Signed by me this 22d day of August, A. D. 1871.

JOHN B. WICKERSHAM.

Witnesses:
NORMAN H. STEVENS.
GEO. W. BARRON. (87)